*J. Buzby,*
*Water Wheel.*
No. 101,579.   Patented Apr. 5, 1870.
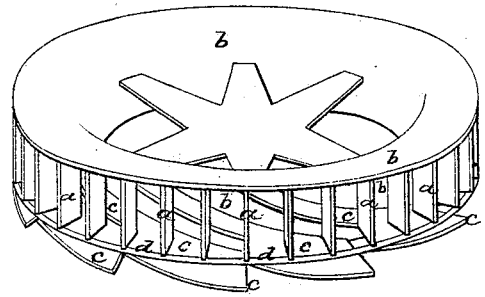
Witnesses:
Victor Hagmann
C. A. Pettit
John Buzby
Inventor:
J. Buzby
per Munn & Co
Attorneys.

United States Patent Office.

JOHN BUZBY, OF MOORESTOWN, NEW JERSEY.

Letters Patent No. 101,579, dated April 5, 1870.

IMPROVEMENT IN WATER-WHEELS.

The Schedule referred to in these Letters Patent and making part of the same

*To all whom it may concern:*

Be it known that I, JOHN BUZBY, of Moorestown, in the county of Burlington and State of New Jersey, have invented a new and useful Improvement in Water-Wheels; and I do hereby declare that the following is a full, clear, and exact description of the same, reference being had to the accompanying drawings forming a part of this specification, in which—

The figure is a perspective view.

This invention consists in the combination of a series of direct-acting vertical buckets on the outside of a water-wheel with a concentric series of reacting inclined buckets next within, extending below the direct-acting buckets, and independent of the outer series, by which arrangement I am enabled to employ a larger number of vertical buckets than as though they formed part of the same series with the inclined buckets, and thus extract more power out of a given amount of water, and, at the same time, secure it an ample vent between the buckets of the inner series.

In the drawing—

*a a* are the vertical buckets of the outer series;

*b*, the body of the wheel, flaring outwardly at the top in the usual manner; and

*c c*, &c., the inclined buckets of the inner series.

The vertical buckets are attached, at their upper ends, to the under side of the flaring body *b*, and, at their lower and outer corners, to a band, *d*. The band *d* is supported upon those parts of the inclined buckets which project outward beneath the vertical buckets. The upper parts of the inner buckets are next within the series of vertical buckets.

In this arrangement, the water which strikes the vertical buckets, instead of finding no vent except beneath, as is the case where the vertical and inclined buckets form part of the same series, passes on until it strikes the outside of the body of the wheel, and then descends between the inclined buckets. Hence I am enabled to increase the number of vertical buckets beyond what would be practicable in an ordinary wheel, and thus cause my wheel to be acted upon more powerfully by a given volume of water than any wheel can be in which there is but one series of buckets, each of which is partly vertical and partly inclined.

Having thus described my invention,

What I claim as new, and desire to secure by Letters Patent, is—

The combination, in one water-wheel, of an outer series of vertical direct-acting buckets *a* with a next inner series of inclined reacting buckets *c*, in the manner described and for the purpose set forth.

JOHN BUZBY.

Witnesses:
 CHAS. A. PETTIT,
 SOLON C. KEMON.